United States Patent [19]
Bookout

[11] Patent Number: 4,992,689
[45] Date of Patent: Feb. 12, 1991

[54] MODULAR PROTECTOR APPARATUS FOR OIL-FILLED SUBMERGIBLE ELECTRIC MOTORS

[75] Inventor: Russell J. Bookout, Bartlesville, Okla.

[73] Assignee: Camco, Inc., Houston, Tex.

[21] Appl. No.: 442,633

[22] Filed: Nov. 29, 1989

[51] Int. Cl.5 .......................... H02K 5/12; F04B 21/02
[52] U.S. Cl. ..................................... 310/87; 417/414;
 417/423.5; 310/89
[58] Field of Search .......................... 166/68, 105, 107;
 310/87, 88, 89, 42; 417/414, 423.14, 423.3,
 423.5

[56] References Cited
U.S. PATENT DOCUMENTS

| RE. 26,783 | 2/1970 | Boyd | 310/87 |
|---|---|---|---|
| 1,701,468 | 2/1929 | Arutunoff | |
| 1,778,787 | 10/1930 | Arutunoff | |
| 2,236,887 | 4/1941 | Arutunoff | 103/87 |
| 2,569,741 | 10/1951 | Arutunoff | 310/87 |
| 2,674,702 | 4/1954 | Arutunoff | 310/87 |
| 2,783,400 | 2/1957 | Arutunoff | 310/87 |
| 2,854,595 | 9/1958 | Arutunoff | 310/87 |
| 3,369,137 | 2/1968 | Sanger | 310/87 |
| 3,384,769 | 5/1968 | Schaefer et al. | 310/87 |
| 3,475,634 | 10/1969 | Bogdanov et al. | 310/87 |
| 3,502,919 | 3/1970 | Boyd et al. | 310/87 |
| 3,854,064 | 12/1974 | Dunbar | 310/87 |
| 4,329,122 | 5/1982 | Owada et al. | 417/365 |
| 4,377,763 | 3/1983 | Drake | 310/87 |
| 4,421,999 | 12/1983 | Beavers et al. | 310/87 |
| 4,487,299 | 12/1984 | Bookout | 310/87 |
| 4,578,608 | 3/1986 | Mech et al. | 310/112 |
| 4,940,911 | 7/1990 | Wilson | 310/87 |

Primary Examiner—Steven L. Stepman
Assistant Examiner—D.L. Rebsch
Attorney, Agent, or Firm—Shapiro and Shapiro

[57] ABSTRACT

Modular protector apparatus for oil-filled submergible electric motors that drive submergible pumps comprises pluralities of components that are interconnected in different system permutations to form protectors appropriate for different applications. The components include heads, chambers, bases, and interconnecting bodies. The bodies have fluid passages that are adapted to communicate with other components and that are opened and closed selectively to provide desired inter-component flow paths. By virtue of the invention, a wide variety of protector apparatus may be manufactured economically.

9 Claims, 15 Drawing Sheets

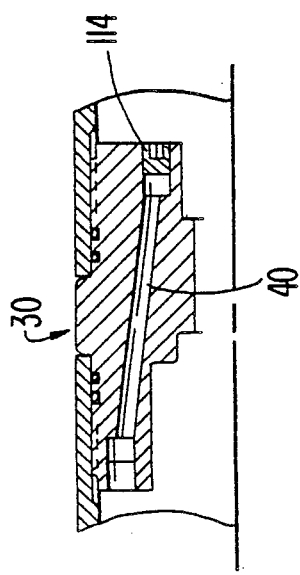
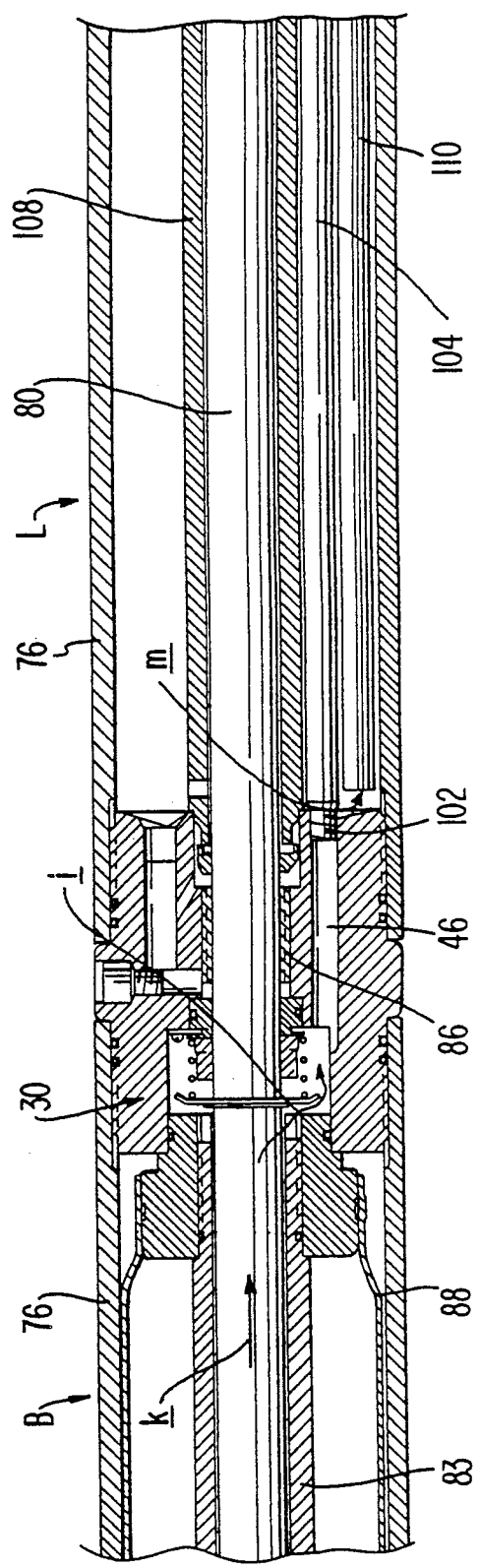

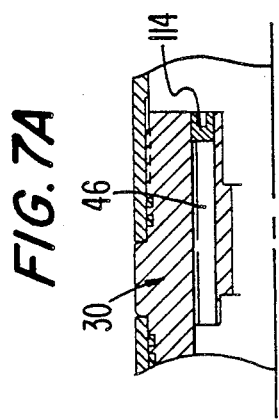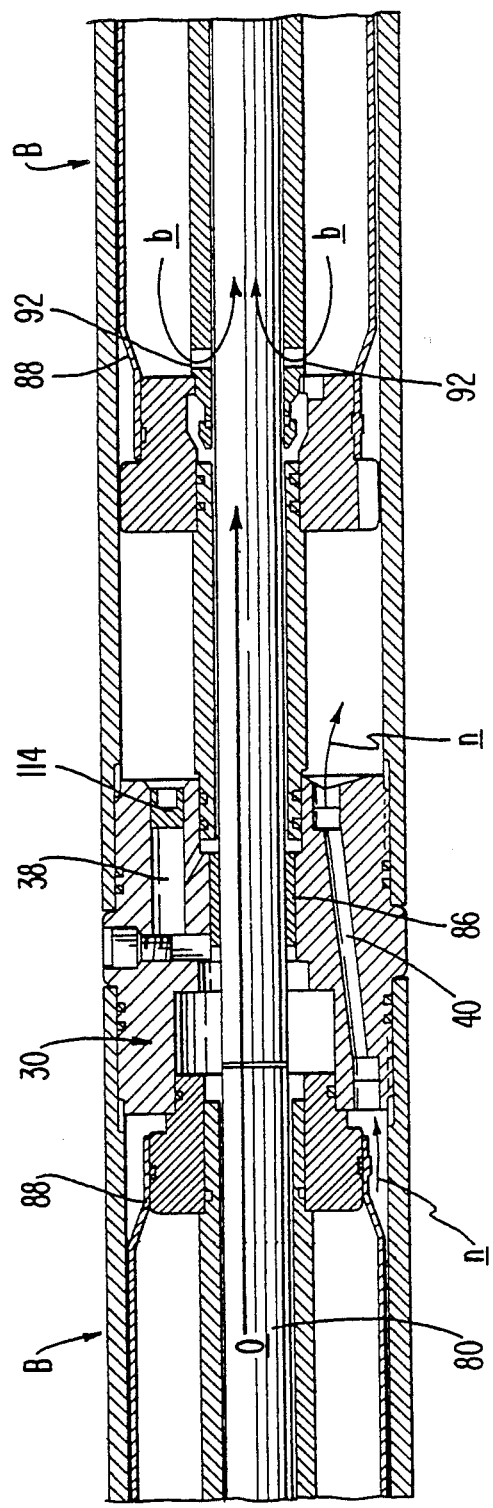

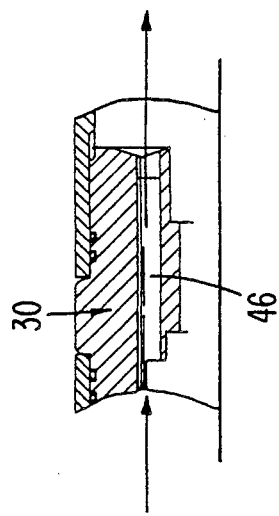
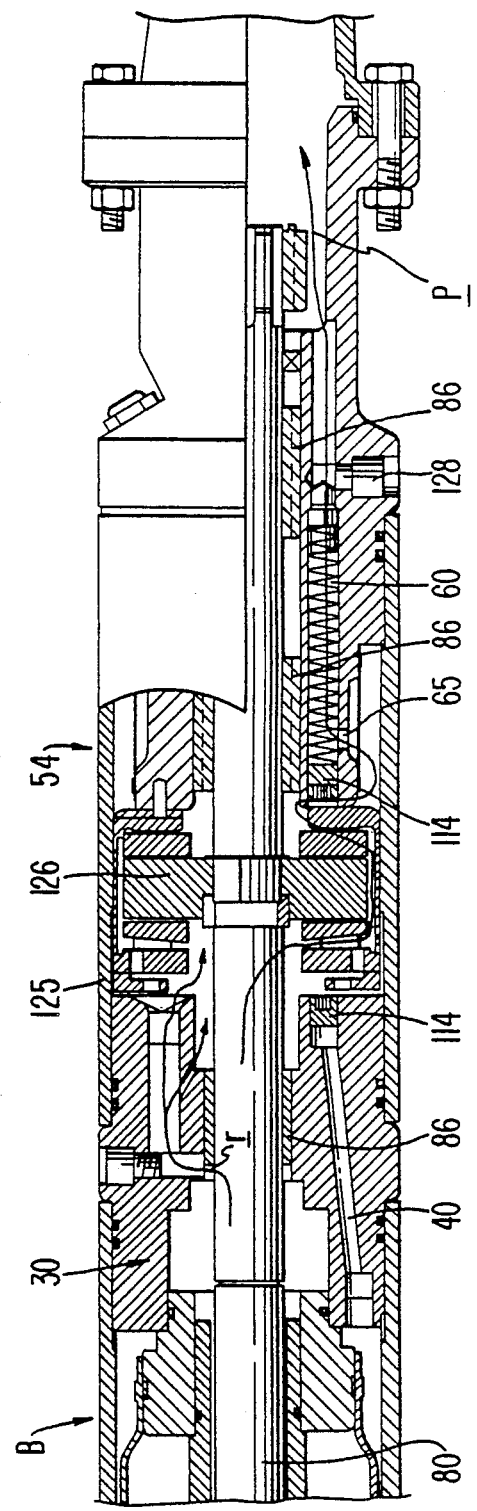

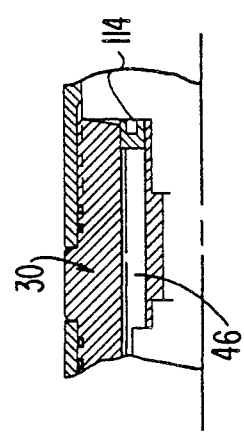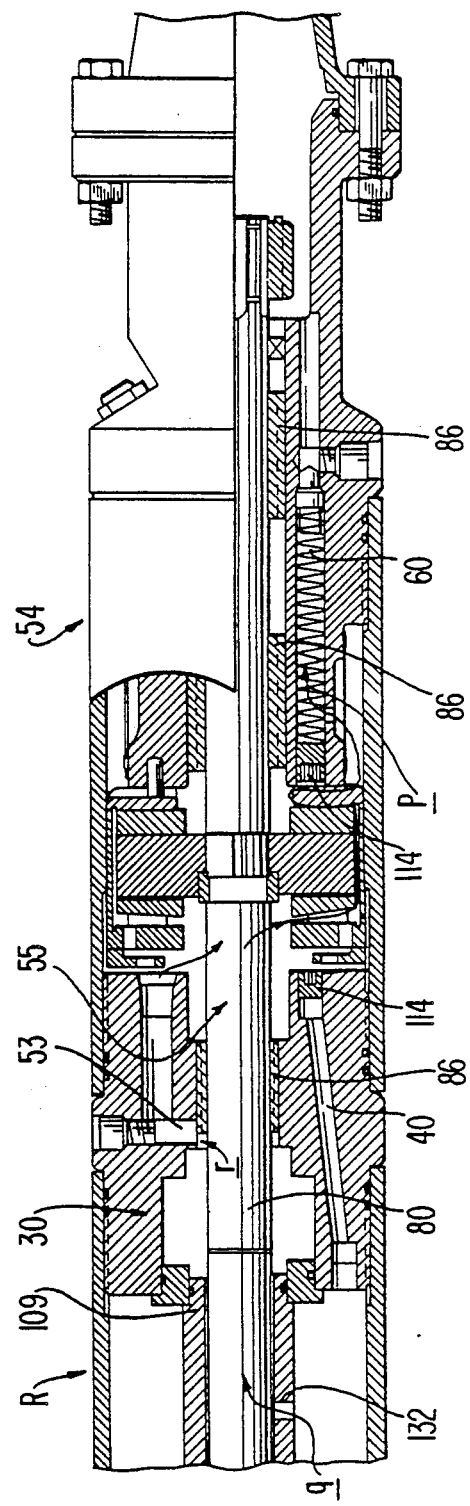

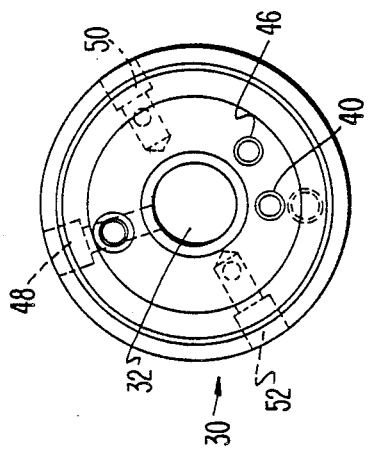
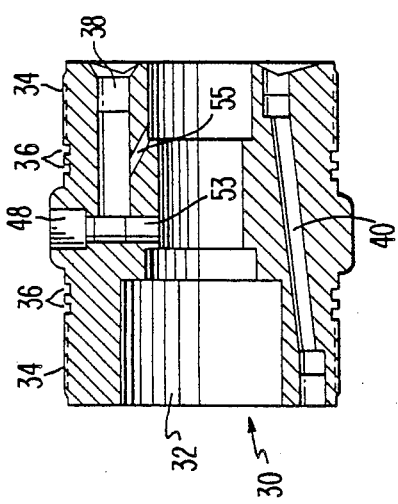
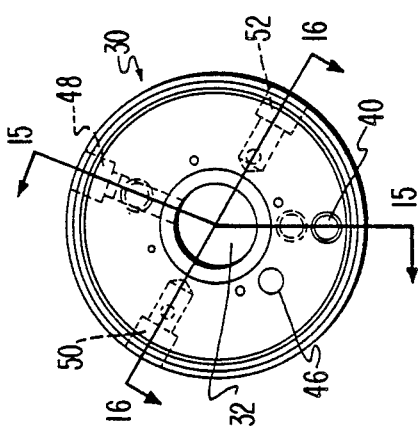
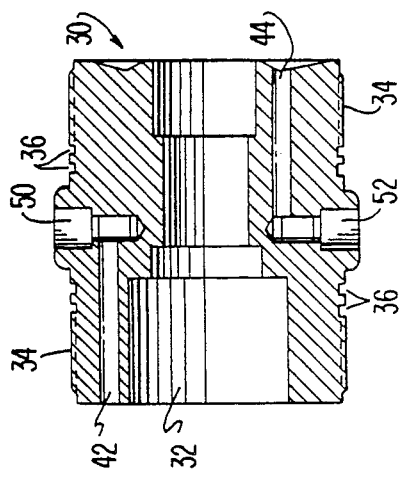

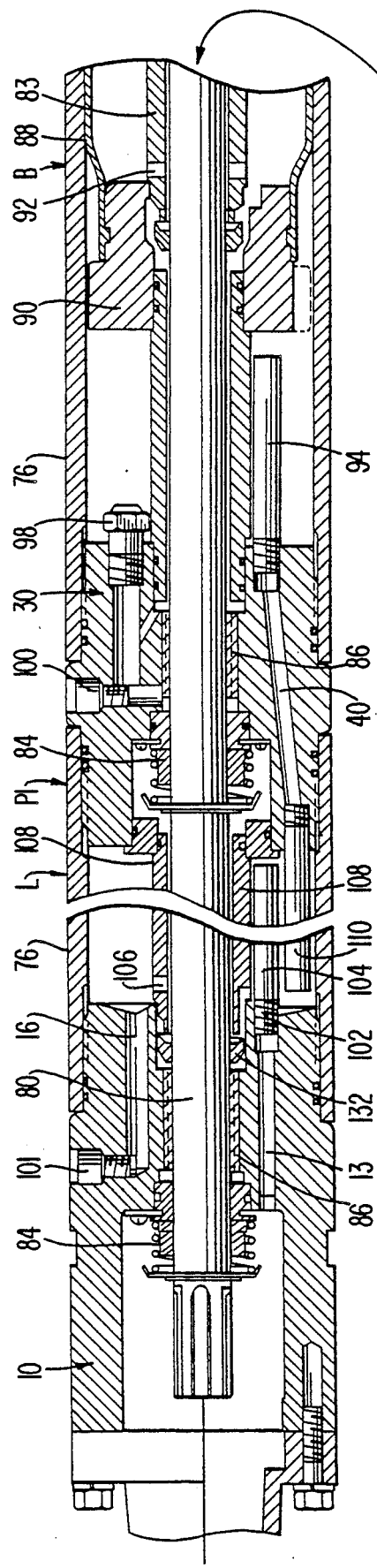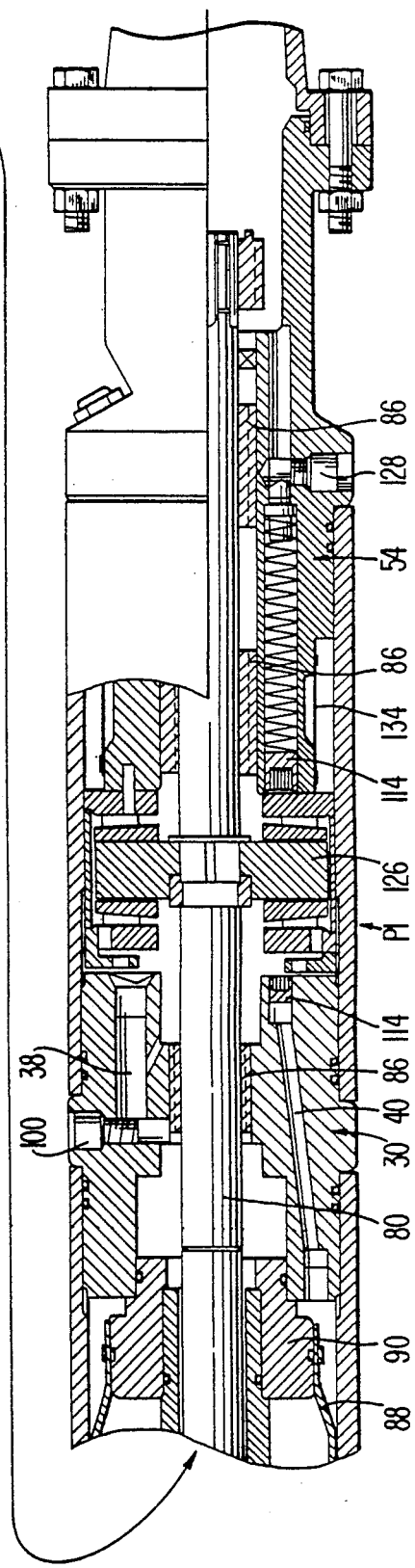
FIG. 21

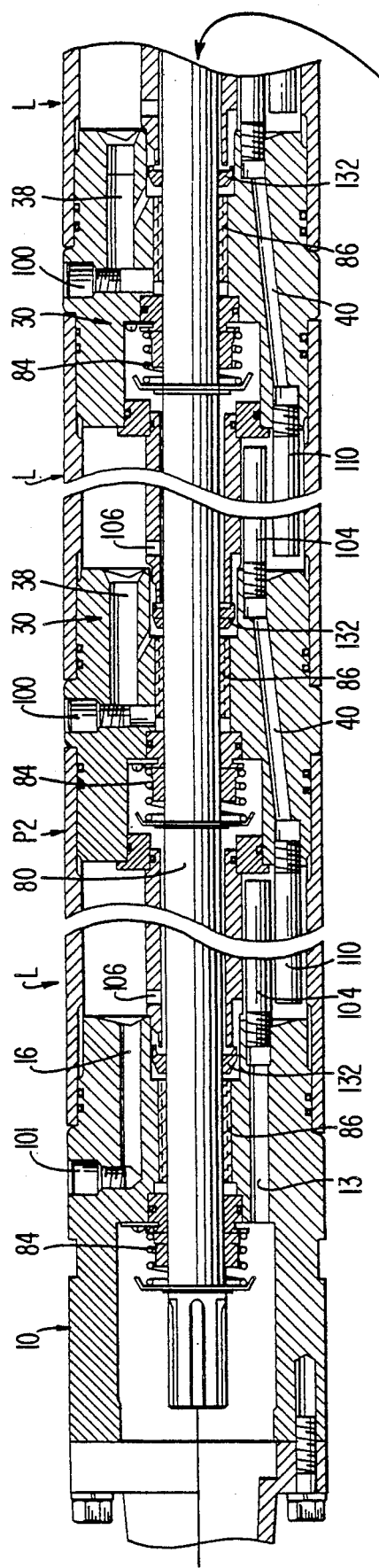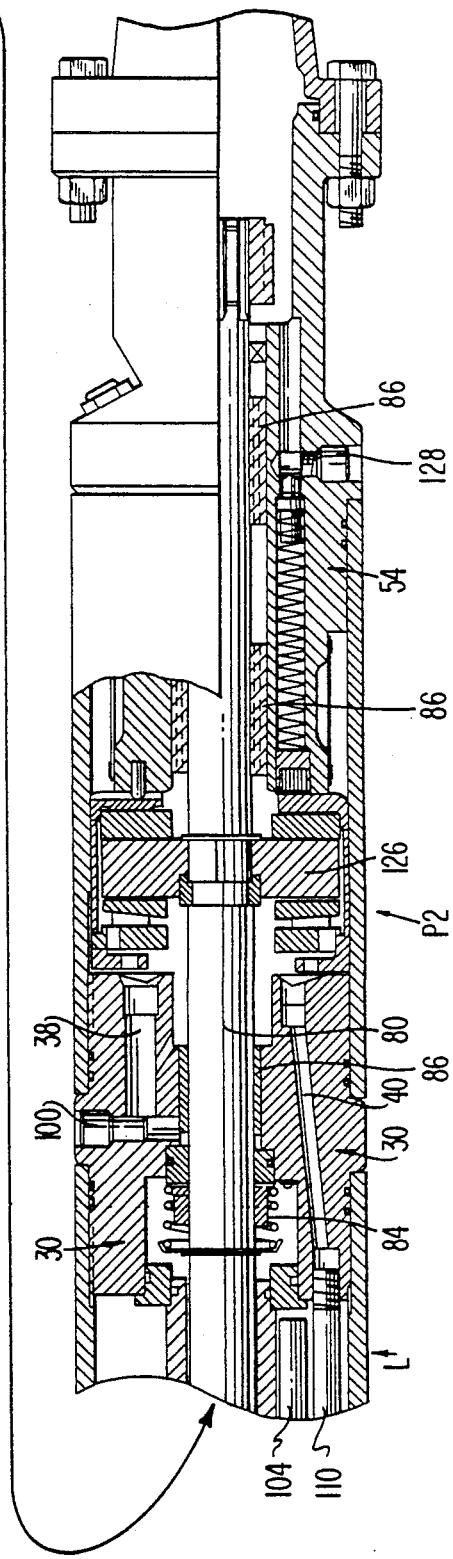
FIG. 22

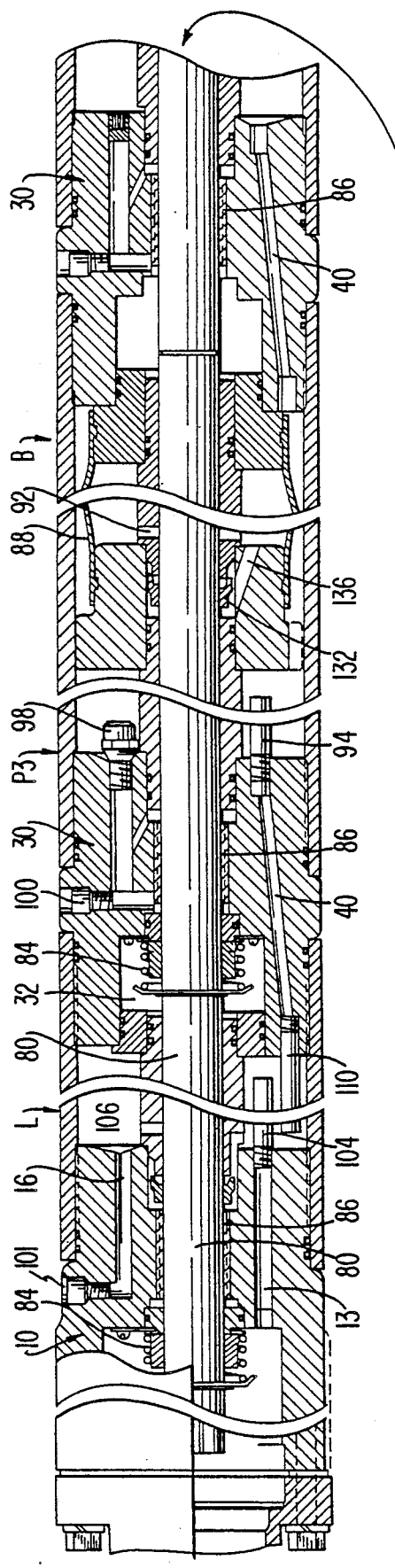
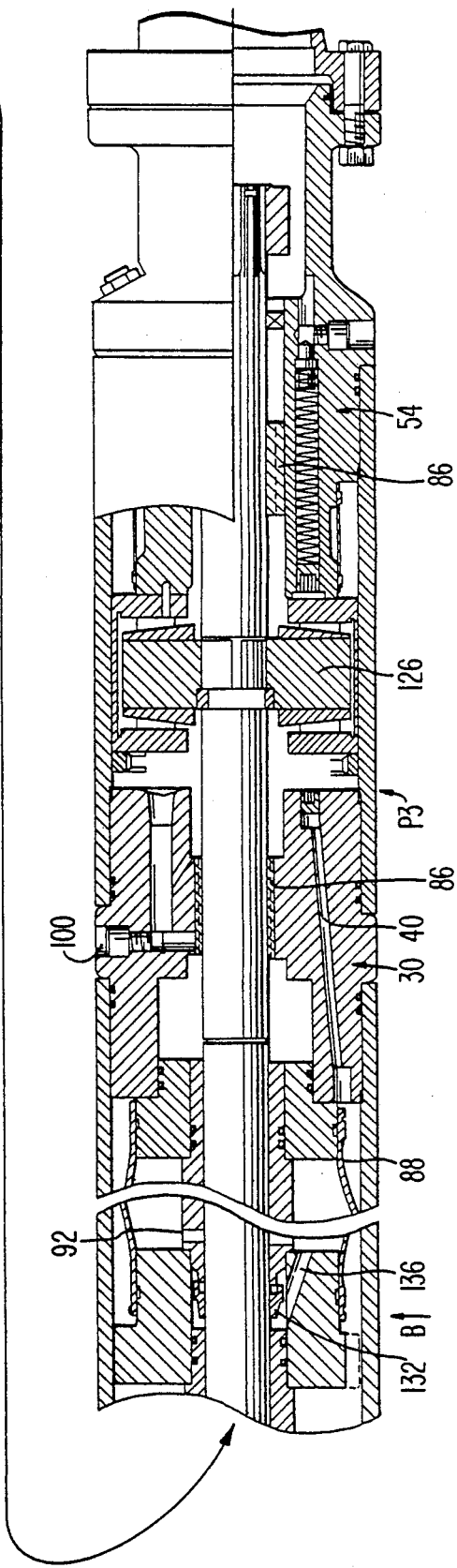
FIG. 23

MODULAR PROTECTOR APPARATUS FOR OIL-FILLED SUBMERGIBLE ELECTRIC MOTORS

BACKGROUND OF THE INVENTION

This invention relates to protector apparatus for oil-filled submergible electric motors that drive submergible pumps and is concerned, more particularly, with the provision of a wide variety of protectors economically.

Oil-filled submergible electric motors that drive submergible pumps in deep wells are commonly provided with protectors (or seal sections) to perform three functions: (1) pressure equalization between the motor oil and the well fluid, (2) accommodation of internal fluid volume change with temperature, and (3) support of pump-produced axial thrust load. The two major types of protectors are positive separation protectors and labyrinth protectors. See, e.g., U.S. Pat. Nos. 2,569,741 and 2,783,400 assigned to the assignee of the present invention. Positive separation protectors employ expansible chambers, such as bags, cylinders with pistons, bellows and the like. Labyrinth protectors employ circuitous fluid flow paths and rely upon the immiscibility and difference in specific gravity (density) of motor oil and well fluid to provide a movable interface between fluids to be separated. Sometimes a "barrier" fluid is employed to separate motor oil and well fluid in order to reduce mixing of the fluids to be separated. In some labyrinth-type protectors used with motors completely filled with an oil which is more dense than the well fluid, the labyrinth is employed to prevent particulates from entering a thrust bearing chamber and the motor.

Usually, all of the functions of the protector are performed within a single section of the equipment string (including the motor, the pump, the protector and other components). Occasionally, however, certain functions are divided between two or more parts. For instance, volume accommodation and pressure balance may be performed by a bellows or bag within the bottom portion of the motor housing, while an additional protector may only contain seals, a thrust bearing, and, in most instances, a pressure relief mechanism.

The manufacture of a wide variety of protectors to accommodate different needs and preferences has necessitated maintenance of a large inventory of different parts and finished assemblies and has required the use of substantially different manufacturing procedures. Such specialized protector manufacture is disadvantageous.

BRIEF DESCRIPTION OF THE INVENTION

The present invention provides a wide variety of protector apparatus more economically than has heretofore been possible, by the utilization of standardized components that are interconnected in different system permutations.

In one of its broader aspects, the invention relates to modular protector apparatus for an oil-filled submergible electric motor, comprising a plurality of chambers adapted to be interconnected physically and hydraulically to provide different systems of chambers, and body means for interconnecting pairs of the chambers physically and hydraulically, the body means having a plurality of passages for providing fluid flow paths between interconnected chambers, the chambers having means for communicating with passages of the body means, and the body means having means for opening and closing passages thereof selectively to provide fluid flow paths in accordance with the different systems of chambers.

In another of its broader aspects, the invention relates to a method of manufacturing protectors for use with oil-filled submergible electric motors of the type employed to drive submergible pumps, comprising providing a plurality of chambers adapted to be interconnected physically and hydraulically to form different systems of chambers, the plurality of chambers including chambers of different types; providing a plurality of identical bodies for interconnecting pairs of the chambers physically and hydraulically, the bodies having a plurality of passages adapted to communicate with pairs of interconnected chambers; and forming different chamber systems, including systems with different numbers and types of chambers, by interconnecting pairs of chambers with bodies and selectively opening or closing passages of those bodies in accordance with the systems to be formed therewith.

BRIEF DESCRIPTION OF THE DRAWINGS

The invention will be further described in conjunction with the accompanying drawings, which illustrate preferred (best mode) and exemplary embodiments, and wherein:

FIG. 6 is a longitudinal sectional view showing a body interconnecting a bag chamber and a labyrinth chamber in series;

FIG. 6A is a fragmentary longitudinal sectional view showing a passage of the body of FIG. 6;

FIG. 7 is a longitudinal sectional view showing a body interconnecting two bag chambers in parallel;

FIG. 7A is a fragmentary longitudinal sectional view showing a passage of the body of FIG. 7;

FIG. 9 is a longitudinal sectional view showing a body connecting a bag chamber to a bearing and base FIG. 9A is a fragmentary longitudinal sectional view showing a passage of the body of FIG. 9;

FIG. 11 is a longitudinal sectional view showing a body connecting a reservoir chamber to a bearing & base;

FIG. 11A is a fragmentary longitudinal sectional view showing a passage of the body of FIG. 11;

FIG. 14 is an end view of a body;

FIGS. 15 and 16 are longitudinal sectional views of the body taken along lines 15—15 and 16—16 of FIG. 14;

FIG. 17 is an opposite end view of the body;

FIG. 18 is a longitudinal sectional view of a base;

FIG. 21 is a contracted longitudinal sectional view showing a protector that includes, in succession, a head, a labyrinth chamber, a body, a bag chamber, a body, and a bearing and base, the chambers being connected in series;

FIG. 22 is a contracted longitudinal sectional view showing a protector including, in succession, a head, a labyrinth chamber, a body, a labyrinth chamber, a body, a labyrinth chamber, a body, and a bearing and base, the chambers being connected in series; and FIG. 23 is a contracted longitudinal sectional view showing a protector including, in succession, a head, a labyrinth chamber, a body, a bag chamber, a body, a bag chamber, a body, and a bearing and base, the labyrinth chamber being connected in series with one of the bag chambers, and the bag chambers being connected in parallel.

DETAILED DESCRIPTION OF PREFERRED EMBODIMENTS

Protectors currently manufactured and sold by the assignee of the present invention include labyrinth and/or bag chambers. Each protector comprises several major components, including a head, a chamber (or chambers), a thrust bearing, a base, and a shaft. Almost all of the major components used in these protectors are not interchangeable. For example, chambers are dedicated for use with particular heads, bodies, bases and shafts. Moreover, the number of different protector configurations is quite limited.

The modular protectors of the present invention comprise standardized parts, including: a head, a chamber (or chambers), a body, a thrust bearing, a base and a shaft. The bearing and the base are combined, reducing the number of separate parts. The chambers are of three different types: labyrinth, bag, and reservoir. Each chamber comprises a housing. For use with a particular motor type, all the chamber housings are identical; all the heads are identical; all the bodies are identical; all the bearings and bases are identical; and all the shafts are identical. As set forth later, additional components may be provided for special applications, as desired.

Figure 13:
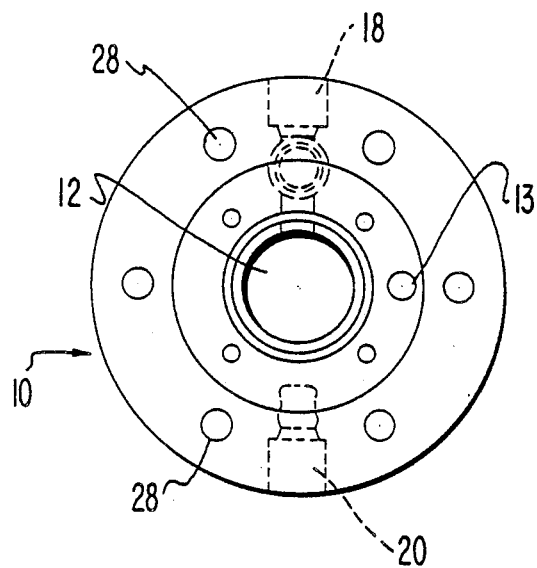
FIG. 13 is an end view of the head as seen from the left in FIG. 12.
Figure 12:
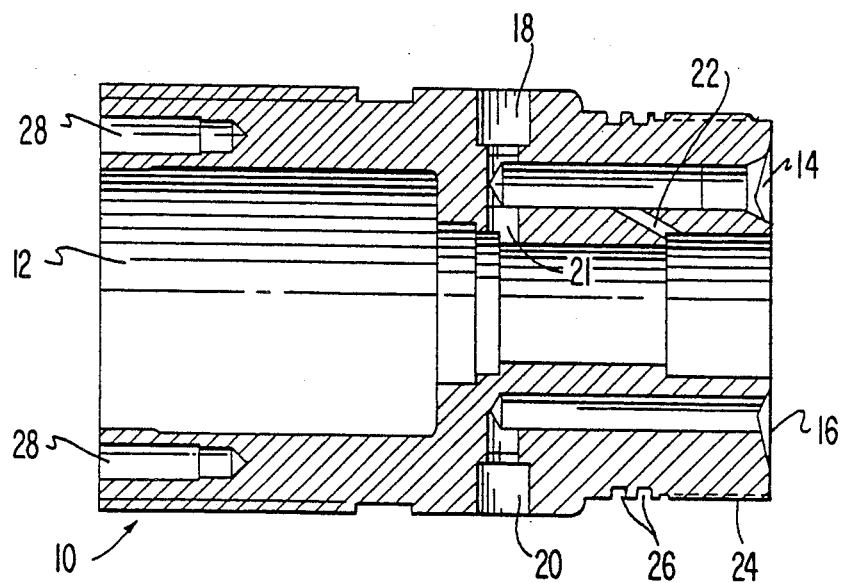
FIG. 12 is a longitudinal sectional view showing a head in greater detail.

As shown in FIGS. 12 and 13, the head 10 is a generally cylindrical component with a stepped central bore 12, a longitudinal passage 13 (indicated in FIG. 13 and shown in other figures referred to later) and a pair of longitudinal passages 14, 16 having transverse extensions 18, 20, respectively. Passage 14 also has a transverse extension 21 to the central bore 12 and is also connected to the central bore 12 by a diagonal passage 22. One end of the head is provided with threads 24 and adjacent circumferential grooves 26 for 0-rings. The other end of the head is provided with a plurality of circumferentially spaced bolt holes 28 by which the head may be bolted to the lower end of a submergible pump or to a temporary cover.

As shown in FIGS. 14-17, the body 30 is a generally cylindrical component having a stepped central bore 32. The body is provided with threads 34 at its opposite ends adjacent to grooves 36 for receiving 0-rings. The body has five longitudinal passages, two of which, 38, 40, are apparent in FIG. 15 and two of which, 42, 44, are apparent in FIG. 16. The fifth passage, 46, is indicated in FIGS. 14 and 17 and is shown in other figures that will be referred to later. Passages 38, 42, 44 have transverse extensions 48, 50, 52, respectively. Passage 38 has a transverse extension 53 to the central bore 32 and is also connected to the central bore by a diagonal passage 55. Passage 40 is inclined to the longitudinal axis of the body, so that one end is closer to the longitudinal axis than the other end. As described in more detail hereinafter, the passages are adapted to communicate with ports or openings of components connected thereto, and passages 38, 40, and 46 are plugged selectively, depending on the configuration of the protector. The body constitutes a bulkhead interface between components interconnected thereby.

Figure 19:
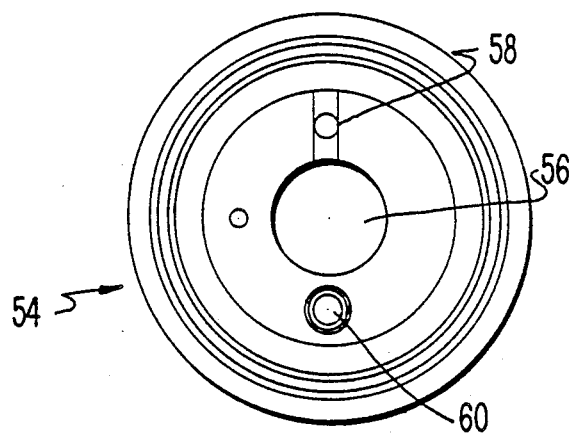
FIGS. 19 and 20 are end views of the base as seen from the left and right of FIG. 18, respectively.
Figure 19:
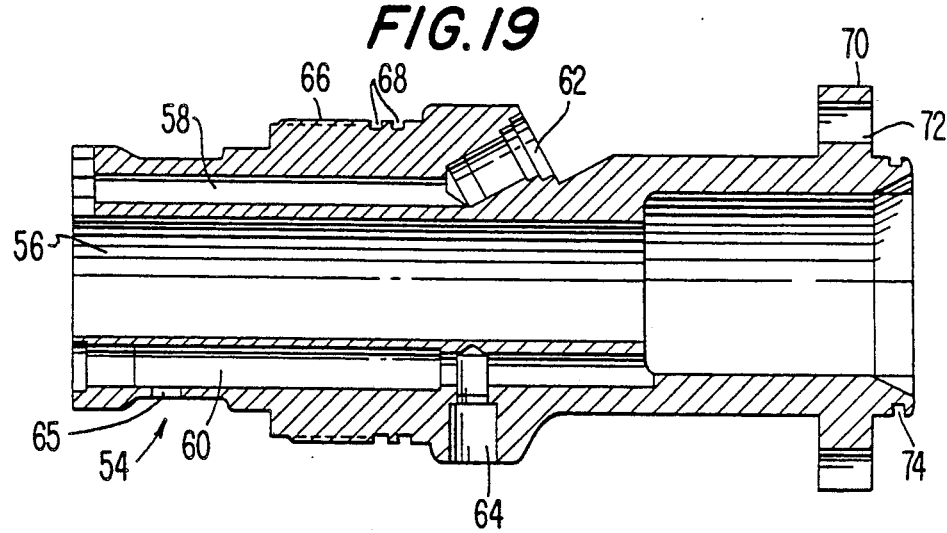
Figure 20:
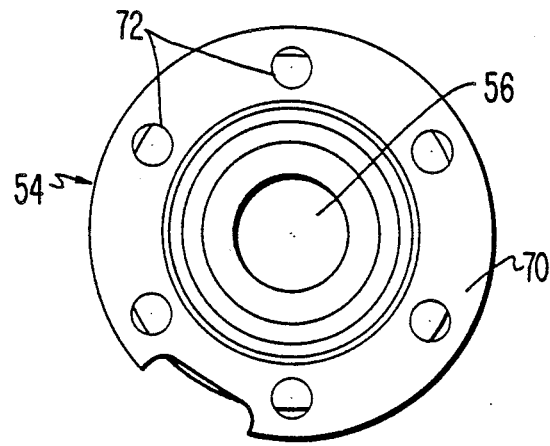

As shown in FIGS. 18-20, the base 54 is a generally cylindrical component having a central bore 56 and having two longitudinal passages 58, 60. Passage 58 has an inclined extension 62 at one end. Passage 60 has an intermediate transverse branch 64 and has a hole 65 near one end. The base 54 is provided with threads 66 adjacent to circumferential grooves 68 for 0-rings and has a flange 70 at one end provided with circumferentially spaced bolt holes 72. An 0-ring groove 74 is provided adjacent to the flange.

Because of the large number of types of protectors (protector configurations or permutations) which can be made in accordance with the invention, a standardized system of designating the protector configurations will be used. The system comprises letters designating the chambers and their interconnection, beginning with the top chamber, and uses the following abbreviations:

L = Labyrinth
B = Bag
R = Reservoir
S = Series
P = Parallel

For example, designation "LSBPB" indicates that there is an upper labyrinth chamber in series with an intermediate bag chamber, which is in parallel with a lower bag chamber. The designation "LSL" indicates an upper labyrinth chamber in series with a lower labyrinth chamber. For ease of understanding, the drawings show parts disposed horizontally, although in actual use the parts are disposed vertically. The term "top" or "upper" and the term "bottom" or "lower" correspond to left and right, respectively, in the drawings.

FIGS. 1-11, which are somewhat diagrammatic, illustrate sub-assemblies of modular components that may be combined in different arrangements to form different protector configurations.

Figure 1:
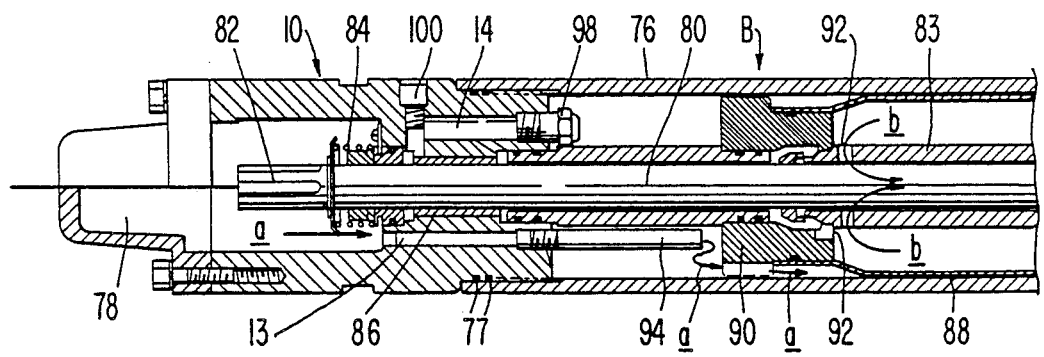
Fig. 1 is a longitudinal sectional view showing a head connected to a bag chamber.

Referring now to FIG. 1, the lower end of a head 10 is shown attached to the upper end of a bag chamber B, the head being threaded into the upper end of the housing 76 of the bag chamber and sealed therein by 0-rings 77. 0-ring seals are shown elsewhere in FIG. 1 and in other figures, but since they are conventional, they will not be described. A temporary cover 78 is shown bolted to the top of the head. When a protector is prepared for use, the temporary cover is removed, and the upper end of the head is bolted to the lower end of a submergible pump (not shown). A shaft 80 having a splined end 82 for connection to the shaft of a submergible pump extends centrally through the head and the bag chamber in a two-section shaft tube 83. A shaft seal 84 is provided adjacent to the splined end of the shaft, and the shaft is supported for rotation in a bearing 86 (such bearings also being shown in other figures). A bag 88 is supported in the housing 76 on a bag frame that includes an upper ring 90 shown in FIG. 1 and a lower ring 90 shown in other figures. The shaft tube 83 has holes 92 providing flow paths between the interior of the bag and the interior of the shaft tube. The shaft tube section between the rings 90 is part of the bag frame. The chamber B has an inlet tube 94 that communicates with the passage 13 of the head. One end of the passage 14 has a pressure relief valve 98 threaded therein. The transverse extension at the other end of the passage is plugged by a seal vent plug 100 threaded therein (also true in FIGS. 2 and 3, although not shown).

Flow of well fluid through the head 10 to the exterior of the bag is indicated by arrows a. Such flow compresses the bag and forces motor oil from the interior of the bag through the holes 92 and along the shaft 80, as indicated by arrows b. In FIGS. 1-11 and 21-23, the arrows show fluid flow in a direction from a submergible pump (not shown) toward an oil-filled submergible motor (not shown). Flow direction from the motor toward the pump would be shown by reversing the direction of the arrows.

Figure 2:
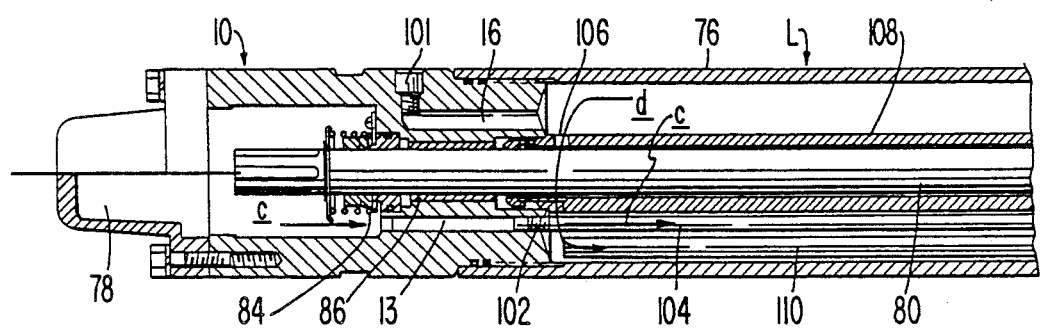
FIG. 2 is a longitudinal sectional view showing a head connected to a labyrinth chamber.

In FIG. 2 the lower end of a head 10 is shown threaded into the upper end of a labyrinth chamber L. The transverse extension of passage 16 is plugged by a vent plug 101 threaded therein (also true in FIG. 1, although not shown). Passage 13 of the head communicates via port 102 with a standpipe 104 in the labyrinth chamber for the admission of well fluid, as indicated by arrows c. Motor oil within the labyrinth chamber passes through a hole 106 in a shaft tube 108 and into a further standpipe 110 in the labyrinth chamber, as indicated by arrow d.

Figure 3:
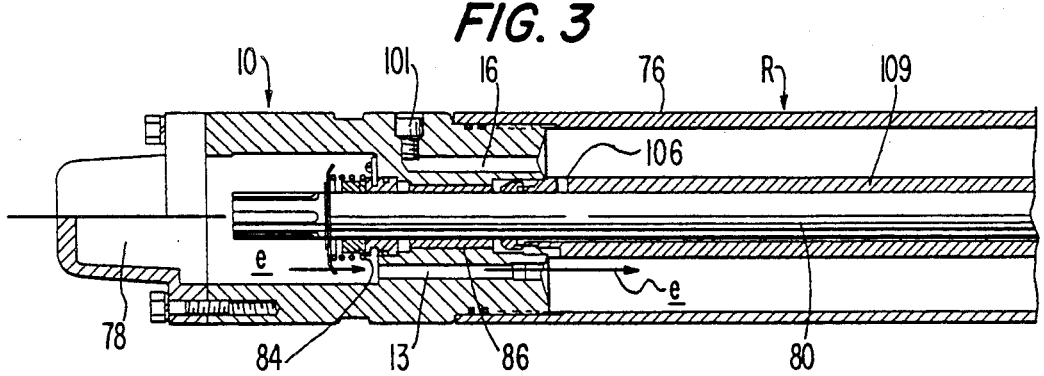
FIG. 3 is a longitudinal sectional view showing a head connected to a reservoir chamber.

FIG. 3 shows the lower end of a head 10 threaded into the upper end of a reservoir chamber R. A vent plug 101 is threaded into the transverse extension of passage 16. A shaft tube 109 having a hole 106 (optional) at the upper end surrounds a shaft 80. Well fluid enters the reservoir chamber through passage 13, as indicated by arrows e. In the reservoir chamber, an interface forms between the well fluid and a heavy motor oil.

Figure 4A:
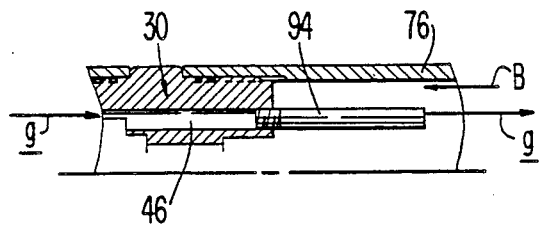
FIGS. 4A and 4B are fragmentary longitudinal sectional views showing passages of the body of FIG. 4.
Figure 4B:
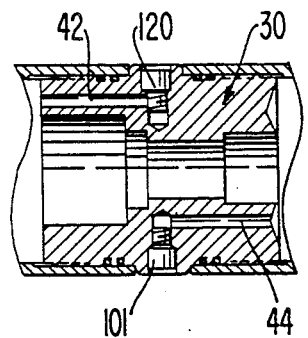
Figure 4:
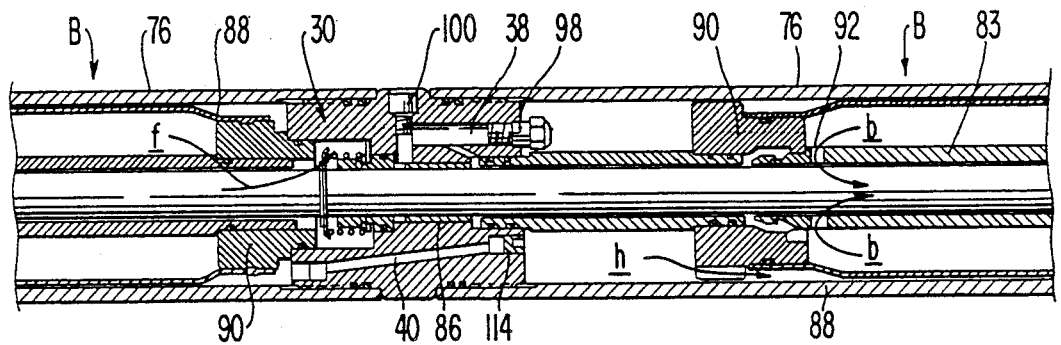
FIG. 4 is a longitudinal sectional view showing a body interconnecting two bag chambers in series.

FIG. 4 shows a body 30 interconnecting a pair of bag chambers B in series. The body is threaded into the housings 76 of the chambers (this being true wherever a body is used). A seal vent plug 100 closes the transverse extension at one end of the passage 38, and the opposite end of the passage has a pressure relief valve 98. Passage 40 of the body is closed at one end by a plug 114 threaded therein. Passage 46 of the body communicates with a tube 94 in the bag chamber B, as shown in FIG. 4A. Oil from the interior of the upper bag chamber B flows along the shaft 80 and then through passage 46 and inlet tube 94 and around the exterior of the bag 88 in the lower bag chamber, as indicated by arrows f, g, and h. Oil in the bag of the lower bag chamber then flows along the shaft 80 via holes 92 in the shaft tube 83, as indicated by arrows b. As shown in FIG. 4B, passage 42 is blocked by a drain plug 120 and passage 44 is blocked by a vent plug 101 (also true in FIGS. 5-11, although not shown).

Figure 5A:
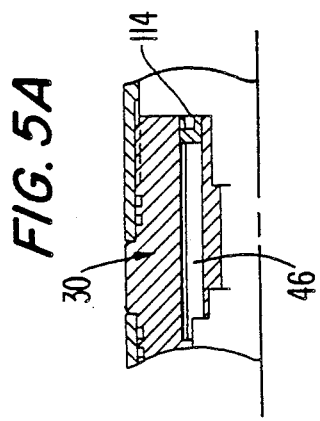
FIG. 5A is a fragmentary longitudinal sectional view showing a passage of the body of FIG. 5.
Figure 5:
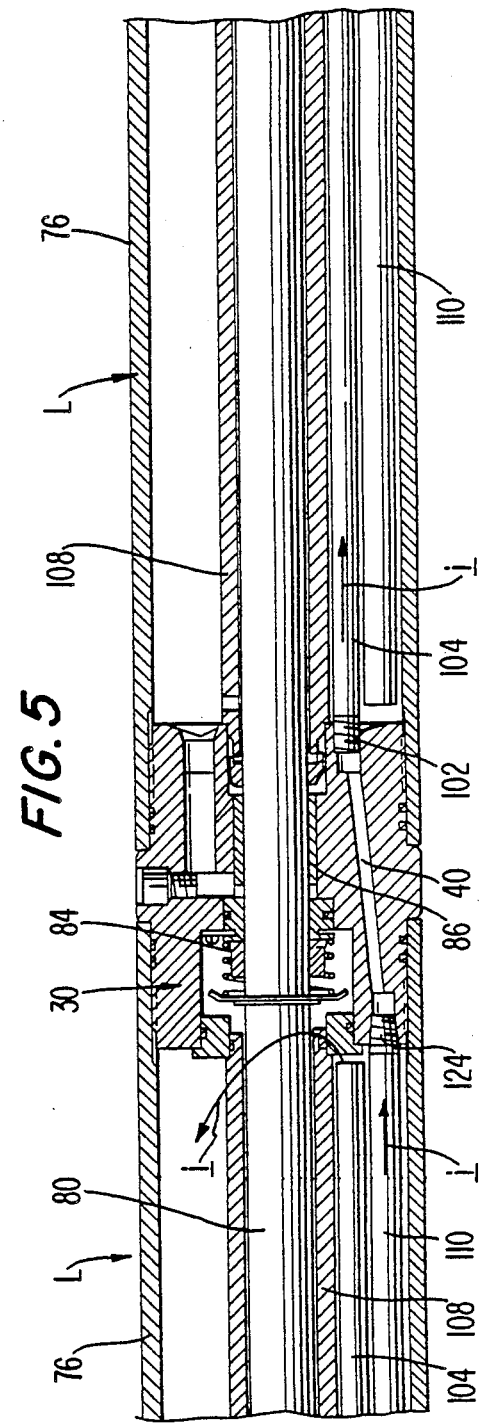
FIG. 5 is a longitudinal sectional view showing a body interconnecting two labyrinth chambers in series.

FIG. 5 shows a body 30 interconnecting two labyrinth chambers L in series. Well fluid from pipe 104 of the upper chamber enters the upper chamber L as indicated by arrow i. Oil from pipe 110 passes through passage 40 of the body 30 and into pipe 104 of the lower chamber L, as indicated by arrows j. Ports 124 and 102 of the upper and lower chambers L communicate with opposite ends of the passage 40, respectively. As shown in FIG. 5A passage 46 is closed by a plug 114.

FIG. 6 shows a body 30 interconnecting a bag chamber B with a labyrinth chamber L in series. Oil flows along shaft 80 in chamber B and enters the pipe 104 of the labyrinth chamber L through passage 46 of the body, as indicated by arrows k and l. Port 102 of pipe 104 communicates with passage 46. Oil from the lower end of the labyrinth chamber L is forced upwardly and enters pipe 110 of the labyrinth chamber, as indicated by arrow m. As shown in FIG. 6A, one end of passage 40 is closed by a plug 114.

FIG. 7 shows a body 30 interconnecting a pair of bag chambers B in parallel. Fluid at the exterior of bag 88 of the upper chamber flows through passage 40 of the body to the exterior of bag 88 of the lower chamber, as indicated by arrows n. Fluid from the interior of bag 88 of the upper chamber flows along the shaft 80 to the interior of bag 88 of the lower chamber, as indicated by arrow o, where it joins fluid flowing along the shaft 80 from bag 88 of the lower chamber via holes 92, as indicated by arrows b. Passage 38 is closed by a plug 114. Passage 46 shown in FIG. 7A is also closed by a plug 114.

Figure 8A:
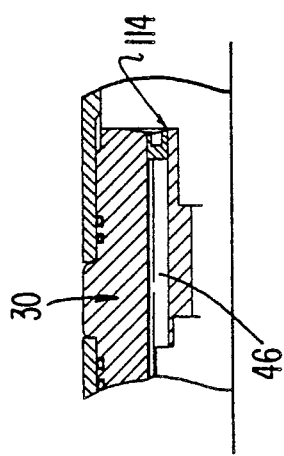
FIG. 8A is a fragmentary longitudinal sectional view showing a passage of the body of FIG. 8.
Figure 8:
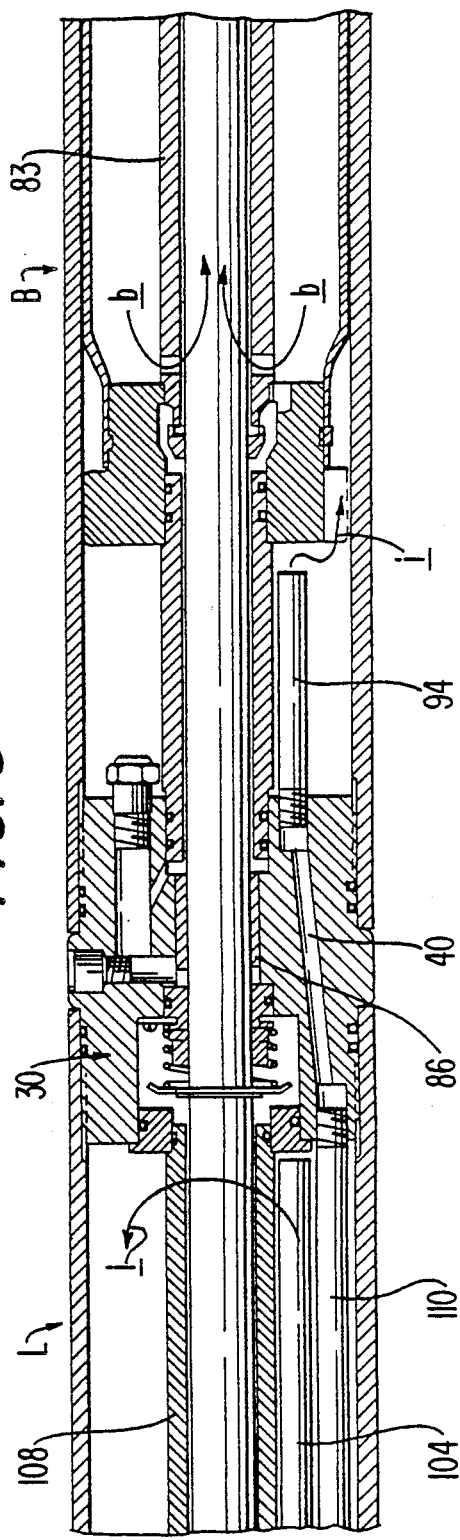
FIG. 8 is a longitudinal sectional view showing a body interconnecting a labyrinth chamber and a bag chamber in series.

FIG. 8 shows a labyrinth chamber L connected in series with a bag chamber B by a body 30. Fluid from pipe 104 enters the space around shaft tube 108 at the lower end of the chamber L, as indicated by arrow i, and fluid at the upper end of the chamber L enters the pipe 110 as indicated by arrow d in FIG. 2. Fluid from pipe 110 passes through passage 40 of the body 30 and enters the chamber B via a tube 94, as indicated by arrow j. The fluid flow path in chamber B is the same as that illustrated in FIG. 1. As shown in FIG. 8A, passage 46 of the body is closed by a plug 114.

FIG. 9 shows the lower end of a bag chamber B connected to a bearing and base 54 by a body 30. As indicated earlier, the bearing and base are combined into one unit and have a common housing 125. Fluid flows along the shaft 80 through the body and passes around the thrust bearing 126 and through passage 60 of the bearing & base via hole 65 to a motor (not shown), as indicated by the arrow p. The upper end of passage 60 is closed by a plug 114, and the lower end of passage 40 of the body is closed by a plug 114. A pre-fill plug 128 closes the intermediate transverse extension of passage 60. Fluid also enters the bearing and base via passages 53, 38, and 55 of the head 30 and via passage 46 shown in FIG. 9A.

Figure 10A:
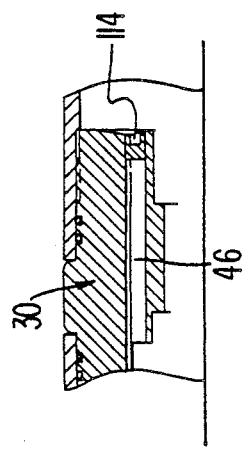
FIG. 10A is a fragmentary longitudinal sectional view showing a passage of the body of FIG. 10.
Figure 10:
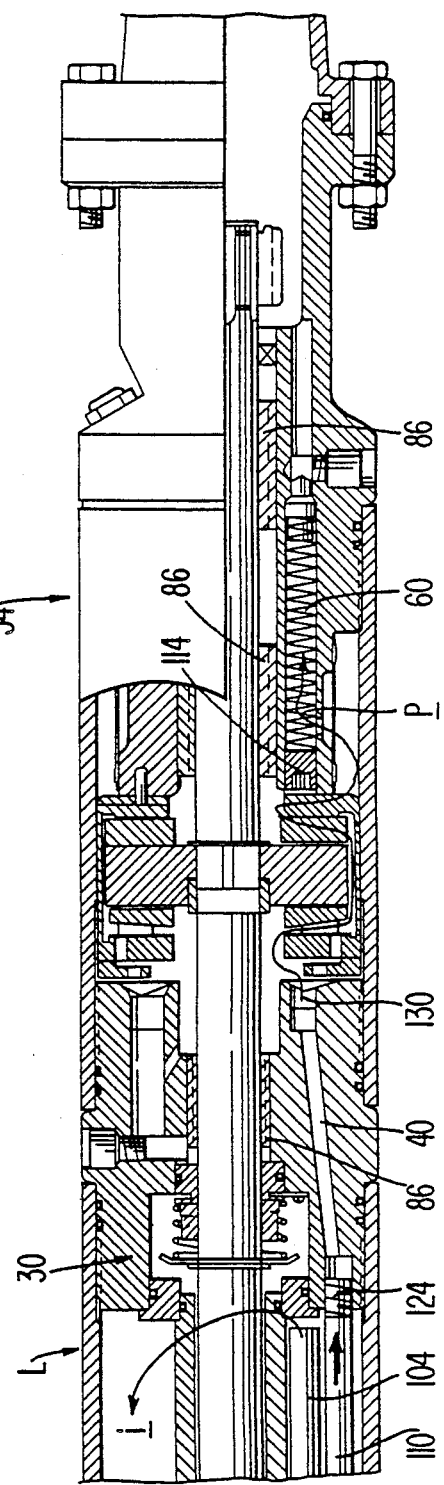
FIG. 10 is a longitudinal sectional view showing a body connecting a labyrinth chamber to a bearing & base.

FIG. 10 shows the lower end of a labyrinth chamber L connected to a bearing and base 54 by a body 30. Fluid enters the bearing and base via passage 40 of the body as indicated by arrow p. A port 124 at the lower end of pipe 110 of the labyrinth chamber L communicates with the upper end of passage 40, and a port 130 at the upper end of the bearing and base communicates with the lower end of passage 40. Passage 60 of the bearing & base is plugged as in FIG. 9, and passage 46 of the body is plugged as shown in FIG. 10A.

FIG. 11 shows the lower end of a reservoir chamber R connected to the upper end of a bearing and base 54 by a body 30. Fluid in the reservoir chamber outside of the shaft tube 109 passes through a hole 132 in the shaft tube, and flows along the shaft 80 through the body and into the bearing & base as indicated by the arrows q and p. Fluid also enters the bearing and base via the transverse extension 53 of passage 38 of the body and through the inclined passage 55, as indicated by the arrows r. As shown in FIG. 11, the lower end of passage 40 of the body is plugged, as is the upper end of passage 60 of the bearing and base. As shown in FIG. 11A the lower end of passage 46 of the body is also plugged.

When a reservoir-type chamber R is employed, the chamber is immediately above the bearing and base, as shown in FIG. 11. The shaft tube 109 used for the reservoir chamber is similar to the shaft tube used for the labyrinth chamber, but has an additional hole 132 located slightly above the chamber bottom to prevent heavy material, such as sand and scale, from being drawn through the thrust bearing into the motor. The upper end of the reservoir chamber has a shaft seal 84, as shown in FIG. 3, even though it is open to the well fluid. This is to prevent sand and scale from entering the top of the shaft tube, where it could fall down to the thrust bearing. The seal also allows the formation of an oil cap around the top bushing, improving its life expectancy. The addition of a short tube (not shown) where the well fluid enters the reservoir chamber will increase the size of the oil cap which can be held in place, so as to provide a greater tolerance to outward seal leakage.

It is apparent that many different protector configurations can be made by the assembly of a head, one or more chambers, and a body to interconnect successive chambers and a body to interconnect a bottom chamber with a bearing and base. FIGS. 21-23 show some of such configurations.

FIG. 21 shows a protector P1 in which a labyrinth chamber L is connected in series with a bag chamber B. FIG. 22 shows a protector P2 in which three labyrinth chambers L are connected in series. FIG. 23 shows a protector P3 in which an upper labyrinth chamber L is connected in series with a bag chamber B that is connected in parallel with a lower bag chamber B. The protector apparatus shown in FIG. 23 is for a motor type that differs from that of the other figures. Shown in FIGS. 21-23 are shedders or slingers 132 that direct leakage past an associated seal to the bottom of a labyrinth chamber L. Also shown is a screen 134 that prevents particulates from entering the motor. Although the operation of labyrinth-type and bag-type protectors is well known, the comments which follow may be helpful to an understanding of the invention.

Referring to FIG. 23, well fluid enters the labyrinth chamber L through passage 13 of head 10 and tube 104 of chamber L and forms a pool beneath the lower end of tube 104. Clean oil floats on top of the pool of well fluid and is forced by the well fluid into tube 110 and through passage 40 of the upper body 30 and into the upper bag chamber B via tube 94. Clean oil also enters the hole 106 and passes along the shaft 80 and into the larger portion of the stepped bore 32 of the body so as to surround the shaft seal 84 disposed therein. A bubble of clean oil at the top of the upper bag chamber B surrounds the pressure relief valve 98.

Oil from the lower end of the labyrinth chamber L passes around the exterior of the bag 88 of the upper bag chamber B and through the passage 40 of the intermediate body 30 into the upper end of the lower bag chamber B. Oil inside of bags 88 passes along the shaft 80 via shaft holes 92 and also passes along the shaft via inclined passages 136 of the upper bag frame 90 of each chamber B. The shedders 132 in the bag chambers direct heavy fluid (leakage) to the bottom of the bags. Oil passing along the shaft 80 enters the bearing and base 54 as described in connection with FIG. 9.

It is evident that the body is a most important component of the modular protector apparatus of the invention. The body forms a bulkhead having communication passages or channels between interconnected components, such as protector chambers. By virtue of the arrangement of the passages through the body and the arrangement of cooperating ports or openings of components connected to the body, it is possible to provide a variety of interconnection modes without interference or non-alignment of parts of the components that are interconnected by the body. All seals are located at the top of the body to allow their height to be easily measured and adjusted (with shims, for example) optimally. This can be an important consideration when building a protector with a number of chambers where the stack-up tolerances can be greater than the allowable variation in seal height. The body is provided with vent and drain holes to allow access to each of the associated chambers for filling or sampling fluid. The latter permits ascertainment of the condition of the protector as well as well fluid intrusion.

The following is a partial list of protector configurations that may be provided by labyrinth, bag, and reservoir chambers in accordance with the invention:

```
B
L
R
LSL
LSB
BSL
BSB
BPB
LSLSL
LSLSB
LSBSL
LSBSB
LSBPB
BSLSB
BSLSL
BPBPB
BPBSL
BSBSB
BSBSL
```

In each case, the protector includes a head and a bearing and base and a body connecting a chamber to the bearing and base. When the protector includes multiple chambers, a body is employed to interconnect each pair of successive chambers. A head may be used with a bearing and base directly (without a chamber) to provide a back-up bearing. If desired, various protectors may have high-load bearings, ferritic steel housings, and high-strength shafts, as well as various elastomers and seal types. The various protector configurations in the foregoing list provide the flexibility to accommodate a wide variety of environments.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. Modular protector apparatus for an oil-filled submergible electric motor comprising;
a plurality of chambers adapted to be interconnected physically and hydraulically to provide different systems of chambers, and body means adapted to be assembled with said chambers for interconnecting pairs of said chambers physically and hydraulically, said body means having a plurality of passages for providing fluid flow paths between pairs of interconnected chambers, said chambers having means for communicating with passages of said body means when pairs of said chambers are interconnected thereby, and said body means having means operable before assembly of said body means with said chambers for opening and closing different passages, respectively, of said body means in order to select from said plurality of passages particular passages to provide fluid flow paths between pairs of chambers assembled with said body means in accordance with the different systems of chambers.

2. Apparatus in accordance with claim 1, wherein said chambers include labyrinth chambers and expansible chambers, each adapted to be interconnected with chambers of the same type or with chambers of a different type via said body means, and wherein said means for opening and closing passages of said body means opens and closes particular passages depending upon the types of chambers interconnected by said body means.

3. Apparatus in accordance with claim 2, wherein some of said chambers are capable of being interconnected to provide series fluid flow or parallel fluid flow selectively, and wherein said means for opening and closing passages of said body means provides fluid flow paths through said body means depending upon whether pairs of chambers interconnected by said body means have parallel flow or series flow.

4. Apparatus in accordance with claim 1, wherein said apparatus includes head means for connecting a first of successive chambers interconnected by said body means to a submergible pump physically and hydraulically, and base means for connecting a last of said successive chambers to a submergible motor physically and hydraulically.

5. Apparatus in accordance with claim 4, wherein each of said chambers comprises a tubular housing adapted to be aligned with tubular housings of other chambers.

6. Apparatus in accordance with claim 5, wherein each of said head means, body means, and base means includes bearing means for rotational support of a shaft extending therethrough.

7. Apparatus in accordance with claim 6, wherein said base means includes a thrust bearing for said shaft.

8. Apparatus in accordance with claim 1, wherein said chambers include a reservoir-type chamber in which a liquid interface is provided between oil of said motor and liquid to be pumped by said submergible pump, said motor oil having density greater than said liquid to be pumped by said pump.

9. Modular protector apparatus for an oil-filled submergible electric motor comprising:
a plurality of chambers adapted to be interconnected physically and hydraulically to provide different systems of chambers, and body means for interconnecting pairs of said chambers physically and hydraulically, said body means having a plurality of passages for providing fluid flow paths between pairs of interconnected chambers, said chambers having means for communicating with passages of said body means when pairs of said chambers are interconnected thereby, and said body means having means for opening and closing passages thereof selectively to provide fluid flow paths between pairs of chambers in accordance with the different systems of chambers;
wherein said chambers include labyrinth chambers and expansible chambers, each adapted to be interconnected with chambers of the same type or with chambers of a different type via said body means, some of said chambers being capable of being interconnected to provide series fluid flow or parallel fluid flow selectively, and wherein said means for opening and closing passages of said body means opens and closes particular passages depending upon the types of chambers interconnected by said body means and depending upon whether pairs of chambers interconnected by said body means have parallel flow or series flow.

* * * * *